United States Patent
Lipa

(10) Patent No.: US 6,856,058 B1
(45) Date of Patent: Feb. 15, 2005

(54) VIBRATORY MOTOR WITH OIL AND FLAME SEAL ASSEMBLY

(75) Inventor: Anthony J. Lipa, Williamsville, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

(21) Appl. No.: 10/808,204

(22) Filed: Mar. 24, 2004

(51) Int. Cl.$^7$ ................................................ H02K 7/06
(52) U.S. Cl. ........................................ 310/81; 310/88
(58) Field of Search .............................. 310/81, 85–90

(56) References Cited

U.S. PATENT DOCUMENTS

| | | | | |
|---|---|---|---|---|
| 1,459,841 A | * | 6/1923 | Mitchell | 74/87 |
| 2,854,594 A | * | 9/1958 | Wolfgang | 310/54 |
| 2,857,535 A | * | 10/1958 | Kroeckel et al. | 310/81 |
| 3,546,505 A | * | 12/1970 | Morris | 310/81 |
| 4,034,246 A | * | 7/1977 | Nakashima et al. | 310/81 |
| 6,172,436 B1 | * | 1/2001 | Subler et al. | 310/90 |
| 6,580,189 B2 | * | 6/2003 | Mooney | 310/81 |

OTHER PUBLICATIONS

Derrick Corporation, Print 14274–00–001, Dated May 18, 1999, Buffalo, New York.

* cited by examiner

Primary Examiner—Dang Le
(74) Attorney, Agent, or Firm—Conley Rose, P.C.

(57) ABSTRACT

A vibratory motor having an elongated housing having opposite ends, an electric motor positioned within the housing between the opposite ends, bearings in the opposite ends, a motor shaft extending into the opposite ends and supported by the bearings, eccentric weight chambers in the opposite ends proximate the bearings and between the bearings and the electric motor, explosion and leak-proof seal assemblies located proximate the eccentric weight chambers and between the eccentric weight chambers and the electric motor, each of the seal assemblies including an oil seal facing an adjacent eccentric weight chamber, and a flame path between the oil seal and the electric motor.

14 Claims, 3 Drawing Sheets

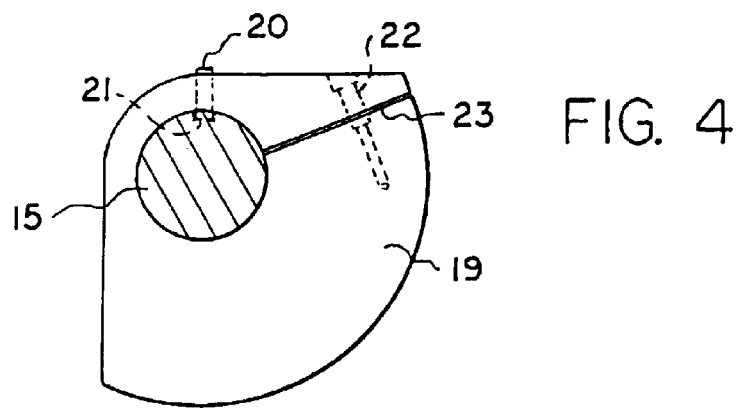
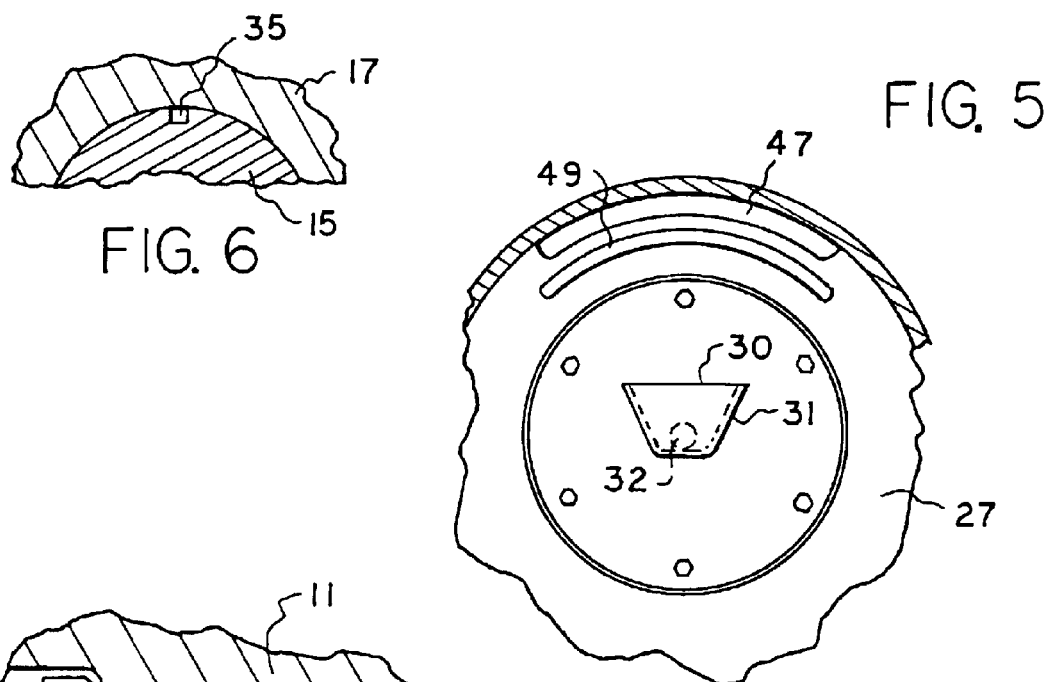
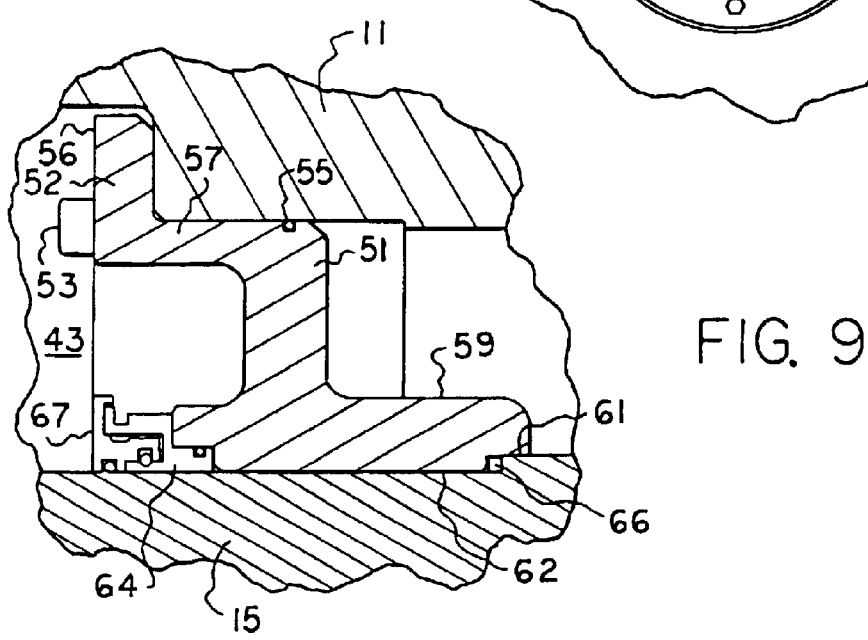

VIBRATORY MOTOR WITH OIL AND FLAME SEAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a vibratory motor having an improved seal assembly which is both explosion-proof and prevents bearing lubricating oil from seeping toward its electric motor.

In the past vibratory motors of the type shown in U.S. Pat. No. 6,580,189 included an explosion-proof seal between the electric motor and the lubricated bearings which supported the motor shaft at the ends of an elongated motor housing. However, the prior seal did not prevent bearing lubricating oil from seeping toward the electric motor of the vibratory motor.

BRIEF SUMMARY OF THE INVENTION

It is one object of the present invention to provide an improved seal assembly between the electric motor and the bearings at the end of an elongated motor housing, with the improved seal assembly being both oil leak-proof and explosion-proof.

A related object of the present invention is to provide an improved vibratory motor as described in the immediately preceding paragraph wherein the oil seal does not extend into an adjacent chamber which houses the eccentric weights mounted on the shaft so that there is room in the eccentric weight chamber for a large number of weights.

A further related object of the present invention is to configure the explosion-proof seal with a boss which extends toward the electric motor and therefore does not extend into the eccentric weight chamber. Other objects and attendant advantages of the present invention will readily be perceived hereafter.

The present invention relates to an improvement in a vibratory motor having an elongated housing having opposite ends, an electric motor positioned within said housing between said opposite ends, bearings in said opposite ends, a motor shaft extending into said opposite ends and supported by said bearings, eccentric weight chambers in said opposite ends proximate said bearings and between said bearings and said electric motor, the improvement comprising explosion and leak-proof seal assemblies located proximate said eccentric weight chambers and between said eccentric weight chambers and said electric motor, each of said seal assemblies including an oil seal facing an adjacent eccentric weight chamber, and a flame path between said oil seal and said electric motor.

The various aspects of the present invention will be more fully understood when the following portions of the specification are read in conjunction with the accompanying drawings:

BRIEF DESCRIPTION OF THE SEVERAL VIEWS OF THE DRAWING

FIG. 4 is a cross sectional view taken substantially along line 4—4 of FIG. 3 and showing the shape of the eccentric weights;

FIG. 5 is a fragmentary cross sectional view taken substantially along line 5—5 of FIG. 3 and showing the funnel which receives lubricating oil;

FIG. 6 is a fragmentary cross sectional view taken substantially along line 6—6 of FIG. 3 and showing an oil conduit;

FIG. 9 is a fragmentary enlarged cross sectional view of the joints between the seal assembly and the motor shaft and the motor housing.

DETAILED DESCRIPTION OF THE INVENTION

Figure 7:
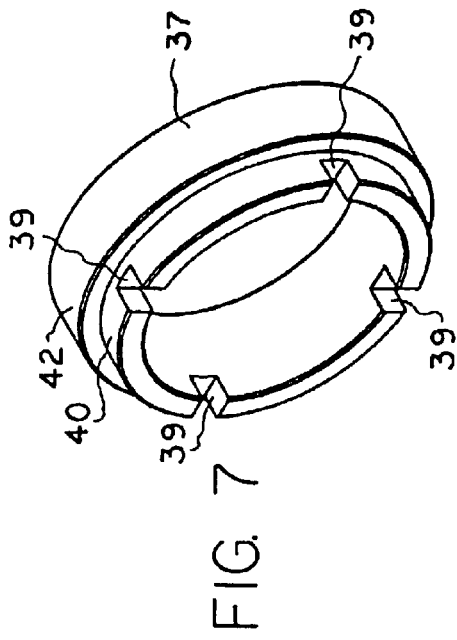
FIG. 7 is a perspective view of the spacer which is used to space the weights from the portion of the motor housing the bearings.
Figure 1:
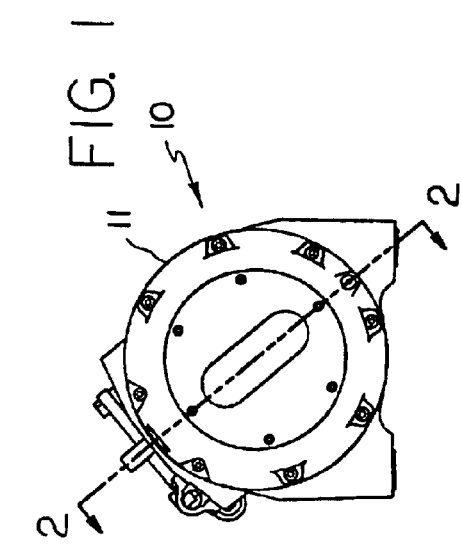
FIG. 1 is an end elevational view of the improved vibratory motor of the present invention.

Summarizing briefly in advance, the improved vibratory motor 10 is an improvement of the vibratory motor having a self-contained continuous bearing lubrication system of U.S. Pat. No. 6,580,189 in that it adds a sealing assembly thereto which both prevents lubricating oil from leaking toward the electric motor and prevents any flame emanating from the electric motor from reaching the lubricating oil for the bearing.

The improved vibratory motor 10 includes an elongated housing 11 having an electric motor 12 mounted substantially at a midpoint thereof. The motor 12 includes a stator 13 and a rotor 14 which is keyed to shaft 15. The shaft is supported at its opposite end portions by bearings 17 which are continuously lubricated in accordance with the teaching of U.S. Pat. No. 6,580,189. Mounted on shaft 15 is a plurality of eccentric weights 19 having the configuration of FIG. 4. Each weight includes a pin 20 which is received in a groove 21 of shaft 15 and the weights are clamped onto shaft 15 by tightening screw 22 which bridges the slot 23 of each weight 19.

Figure 2:
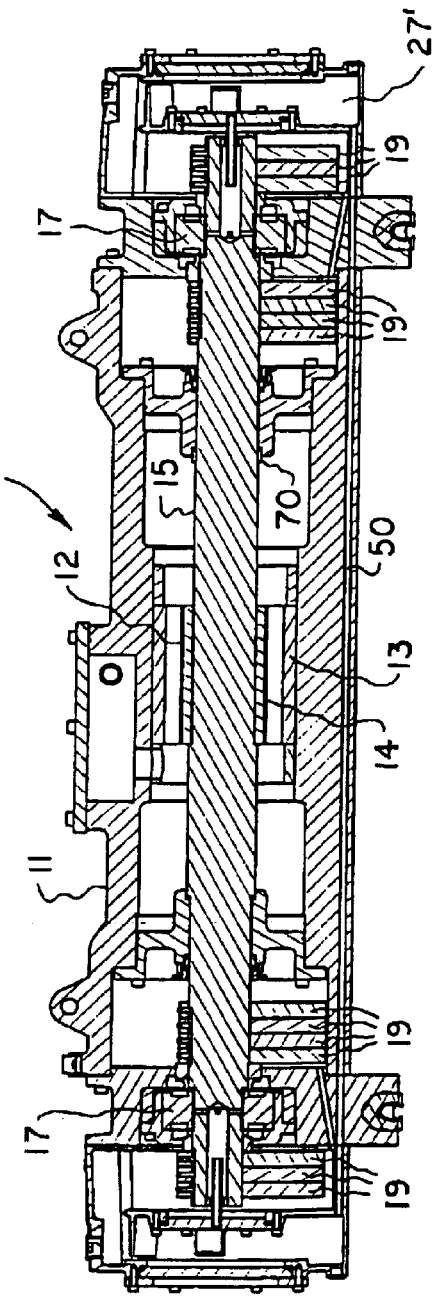
FIG. 2 is a cross sectional view taken substantially along line 2—2 of FIG. 1.

At this point it is to be noted that the bearing and weight constructions at each end portion of the vibratory motor are mirror images. Therefore, the structure only at the left end portion of FIG. 2 will be described, and it will be understood that the undescribed structure at the right end of FIG. 2 is the mirror image thereof.

The continuous bearing lubrication structure will be briefly described solely because of the fact that an oil seal is provided as part of the seal assembly to prevent oil from seeping toward the electric motor 12. The basic portions of this lubrication system is completely described in U.S. Pat. No. 6,580,189, which is incorporated herein by reference. However, there may be minor structural variations between the present continuous lubrication structure and that of the patent.

Briefly, bearing 17 is a roller type of bearing which has an inner race, and outer race, and a plurality of roller bearings therebetween. Bearing 17 is mounted into motor housing portion 23 in the following manner. A ring 24 is shrunk-fitted into housing portion 23. The outer race of bearing 17 is press-fitted into bearing bracket 25 and the inner race of bearing 17 is press-fitted onto shaft 15. The bearing bracket 25 is then suitably bolted to ring 24 to complete the bearing assembly.

The bearing 17 is lubricated in the following manner. A pool of lubricating oil is contained in chamber 27. As the motor 10 operates, the vibrations will cause the oil in chamber 27 to splash violently and enter the open top 30 of funnel 31 and thereafter pass through tube 32 into the hollow inside 33 of shaft 15. The oil is thereafter conducted to the roller bearing 17 in the following manner. The oil travels outwardly through four conduits 34 in shaft 15 which are spaced 900 apart and thereafter enters four grooves 35 in shaft 15. The oil then passes along the outside of the inner race of bearing 17 and through the entire bearing to lubricate it. This is fully described in U.S. Pat. No. 6,580,189.

Figure 3:
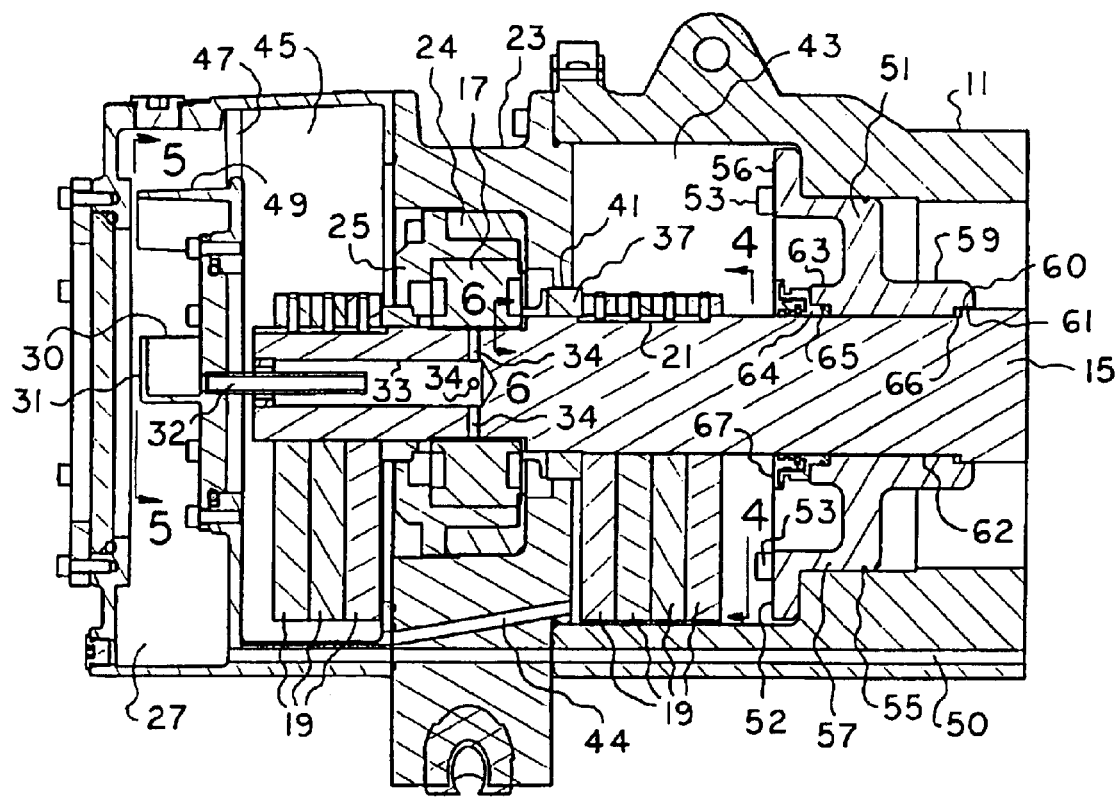
FIG. 3 is an enlarged view of the left end of FIG. 2.
Figure 8:
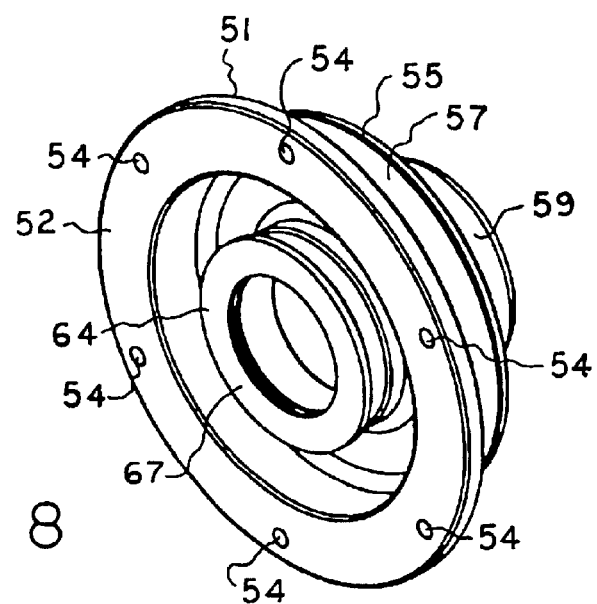
FIG. 8 is a perspective view of the explosion-proof and leak-proof seal assembly.

A spacer ring 37 (FIGS. 3 and 7) is shrunk-fitted onto shaft 15 to rotate therewith. Spacer 37 spaces weights 19 away from housing portion 23. A plurality of indented portions 39 and the smaller diameter portion 40 of spacer 39 receive oil, and there is a clearance 41 between the outer surface 42 of spacer 37 and the adjacent portion of housing 23 which constitutes a passage through which oil enters chamber 43. The oil then passes from chamber 43 through conduit 44 into chamber 45. As shaft 15 rotates, the oil will be thrown upwardly by weights 19 through opening 47 (FIGS. 3 and 5) above shelf 49 and will enter chamber 27 from which the lubrication cycle is repeated. It is to be noted that chamber 27 is in communication with its mirror-image counterpart chamber 27' through conduit 50 in housing 11, thereby equalizing the level of lubricating oil in both of these chambers. As noted above, the basic structure of the continuous lubrication system is set forth in U.S. Pat. No. 6,580,189.

In accordance with the present invention, an explosion-proof and leak-proof seal assembly 51 is provided to prevent any flame emanating from motor 12 from entering chamber 43 and for preventing any oil from chamber 43 from passing toward motor 12. The seal assembly 51 includes an outer rim consisting of rim portion 52 and rim portion 57. Rim portion 57 is shrunk-fitted into housing 11 and rim portion 52 is bolted to housing 11 by a plurality of bolts 53 which pass through holes 54. This double fastening is desired because of the violent vibration to which motor 10 is subjected. Rim portion 52 has a face 56 which faces chamber 43. An O-ring 55 provides a seal between cylindrical rim portion 57 and the adjacent portion of housing 11. A boss or protuberance 59 extends outwardly beyond shrink-fitted portion 57 toward motor 12. The end of boss 59 is configured with a counterbore 60 which receives stepped portion 61 of shaft 15 to provide a labyrinth. The overlap between the stepped portion 61 of the shaft and the counterbore 60 is 0.25 inches long and the diametrical clearance is 0.0275 inches and there is an open space at 66 which is 0.125 inches long and 0.3040 inches radially. A flame path 62, which is essentially a clearance between shaft 15 and boss 59 extends lengthwise for a prescribed distance so that any flame which may enter this clearance from motor 12 will be dissipated before it reaches the end 63 of seal assembly 51. By way of example, in the present instance, the length of the flame path is 2.3750 inches and the diameter of the shaft is 2.6340 inches and the clearance with the shaft 15 is 0.0275 inches. It will be appreciated that the flame path 62 has to be dimensioned to meet safety requirements. A slightly different construction is at the right side of the shaft where a labyrinth ring 70 is shrunk-fitted onto the shaft 15 to provide a labyrinth with the right seal assembly having the same dimensions as the above-described labyrinth. Also, the flame path has the same dimensions as described above relative to flame path 62.

The seal assembly 51 also carries an oil seal 64 at its end facing chamber 43. This seal is pressed into the recess at end 63 and an O-ring 65 is placed therebetween. The seal 64 is of the type known under the trademark INPRO/SEAL which is manufactured by the Inpro/Seal Company of Rock Island, Ill. The face 67 of the seal does not extend any distance beyond face 56 of the seal assembly into chamber 43, thereby leaving room within chamber 43 in the event that an additional eccentric weight 19 is to be mounted on shaft 15. In this event, the groove 21 might have to be extended. Also, the oil seal should not extend any substantial distance into chamber 43 which would prevent the adding of eccentric weights in chamber 43. It is to be understood that the foregoing terminology is intended to include the condition wherein the face of the oil seal does not extend into the adjacent eccentric weight chamber at all.

While a preferred embodiment of the present invention has been disclosed, it will be appreciated that it is not limited thereto but may be otherwise embodied within the scope of the following claims.

What is claimed is:

1. In a vibratory motor having an elongated housing having opposite ends, an electric motor positioned within said housing between said opposite ends, bearings in said opposite ends, a motor shaft extending into said opposite ends and supported by said bearings, eccentric weight chambers in said opposite ends proximate said bearings and between said bearings and said electric motor, the improvement comprising explosion and leak-proof seal assemblies located proximate said eccentric weight chambers and between said eccentric weight chambers and said electric motor, each of said seal assemblies including an oil seal facing an adjacent eccentric weight chamber, and a flame path between said oil seal and said electric motor.

2. In a vibratory motor as set forth in claim 1 wherein each of said explosion and leak-proof seal assemblies comprises an outer rim which is fitted into said housing.

3. In a vibratory motor as set forth in claim 2 wherein each of said seal assemblies includes a face facing its adjacent eccentric weight chamber, and wherein each of said oil seals has an outer surface which does not extend substantially beyond said face toward its adjacent eccentric weight chamber.

4. In a vibratory motor as set forth in claim 3 wherein each of said flame paths is within an elongated boss which extends toward said electric motor.

5. In a vibratory motor as set forth in claim 2 wherein said flame path is located within an elongated boss within said outer rim and which extends toward said electric motor.

6. In a vibratory motor as set forth in claim 5 including an oil seal supported within said outer rim and located between its adjacent eccentric weight chamber and said boss.

7. In a vibratory motor as set forth in claim 6 wherein said oil seal does not extend any substantial distance into said eccentric weight chamber.

8. In a vibratory motor as set forth in claim 1 wherein said vibratory motor includes an oil passage between each of said bearings and said eccentric weight chambers, and wherein said improvement comprises each of said explosion and leak-proof seals including an outer rim which is fitted into said housing.

9. In a vibratory motor as set forth in claim 8 wherein each of said outer rims includes a face facing its adjacent eccentric weight chamber, and wherein each of said oil seals has an outer surface which does not extend substantially beyond said face toward its adjacent eccentric weight chamber.

10. In a vibratory motor as set forth in claim 9 wherein each of said flame paths is within an elongated boss which extends toward said electric motor.

11. In a vibratory motor as set forth in claim 8 wherein said flame path is located within an elongated boss within said outer rim and which extends toward said electric motor.

12. In a vibratory motor as set forth in claim 11 including an oil seal supported within said outer rim and located between said boss and its adjacent eccentric weight chamber.

13. In a vibratory motor as set forth in claim 12 wherein said oil seal does not extend any substantial distance into said eccentric weight chamber.

14. In a vibratory motor as set forth in claim 1 wherein each of said explosion and leaf-proof seal assemblies comprises an outer rim which includes a first portion which is shrunk-fitted into said housing, and a second portion which is bolted to said housing.

\* \* \* \* \*